Figure 1:
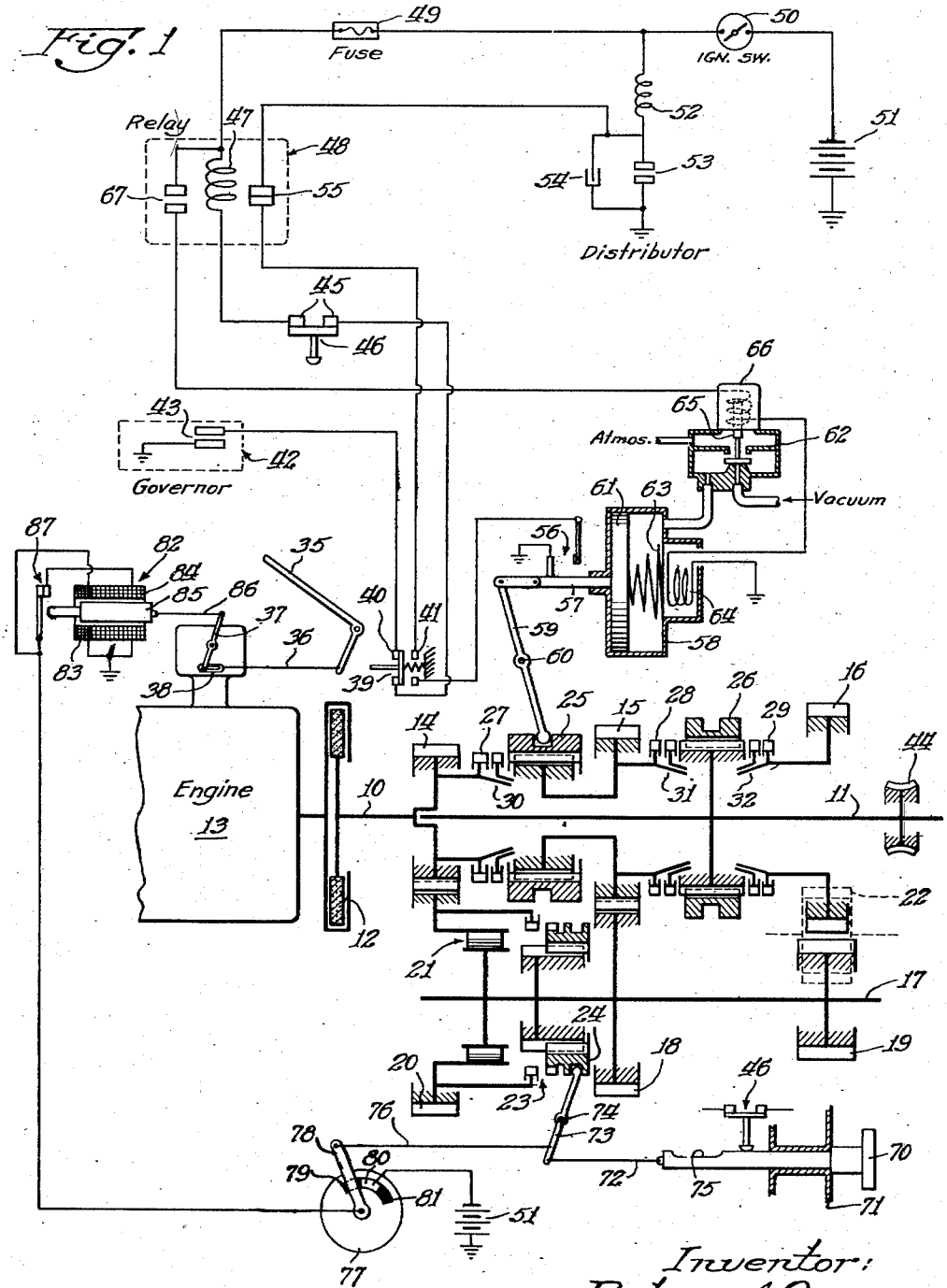

Dec. 25, 1951 P. ORR 2,579,693
TRANSMISSION CONTROL MECHANISM
Filed Jan. 9, 1946 2 SHEETS—SHEET 1

Inventor:
Palmer Orr

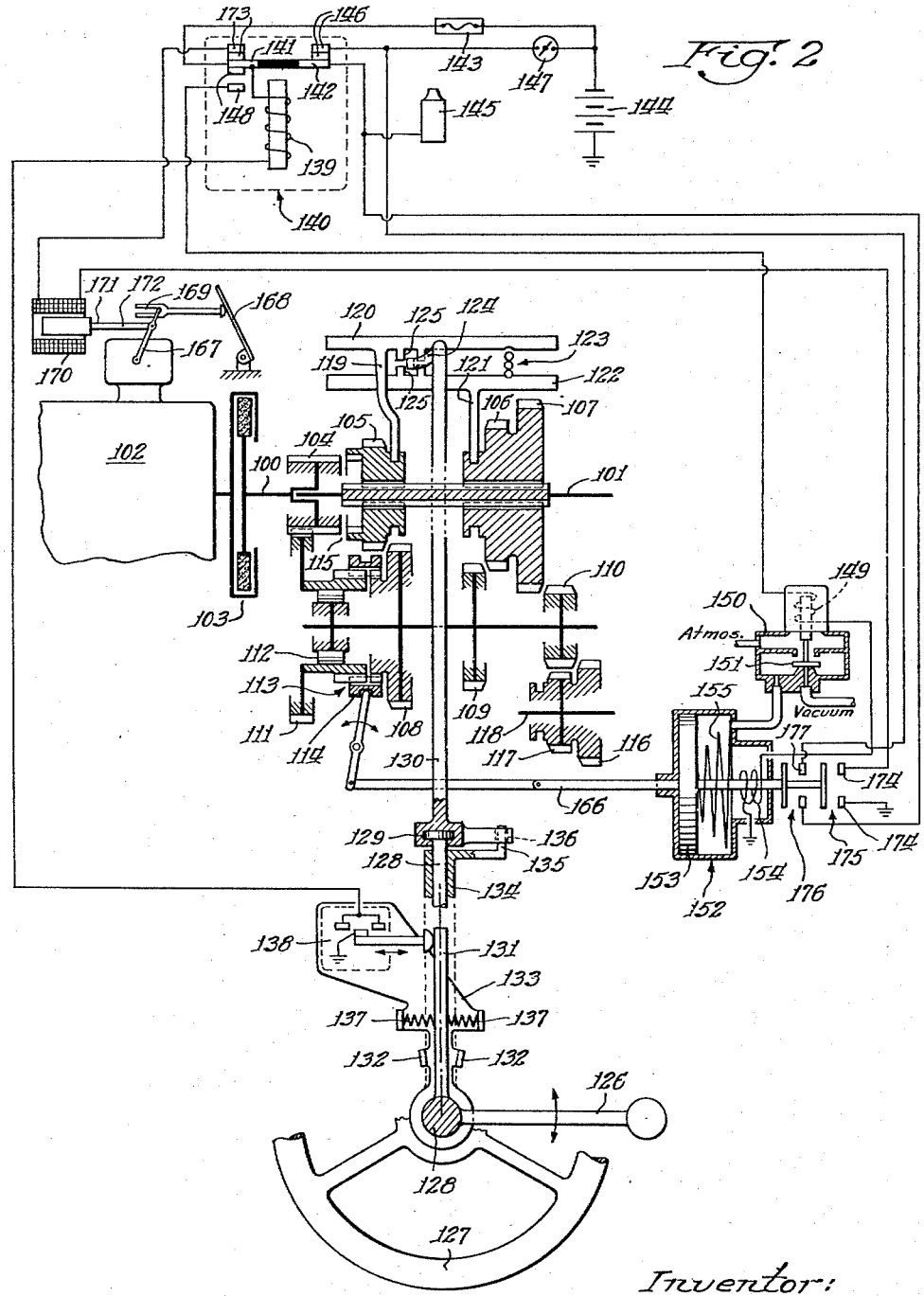

Patented Dec. 25, 1951

2,579,693

UNITED STATES PATENT OFFICE 2,579,693

TRANSMISSION CONTROL MECHANISM

Palmer Orr, Muncie, Ind., assignor to Borg-Warner Corporation, Chicago, Ill., a corporation of Illinois Application January 9, 1946, Serial No. 639,989

11 Claims. (Cl. 74—472)

My invention relates to transmissions and more specifically to transmissions particularly adapted for use on automotive vehicles.

One-way couplings or clutches have found quite widespread usage in automotive transmissions due to the fact that, for certain uses, advantageous results are obtained. It is, however, desirable in some cases to lock up these one-way clutches by providing positive clutches in parallel with them which, when engaged, provide a two-way drive between the drive and driven parts of the one-way clutches. A one-way clutch in a power train allows the vehicle to move forwardly without the drag of the engine, and this is undesirable when descending hills or mountains, for example, and in this case such positive clutches are desirable, as will be readily understood.

It is an object of the present invention to provide improved mechanism for engaging and disengaging the positive clutches which are in parallel with the one-way clutches, hereinabove mentioned. To this end it is an object to provide means for temporarily opening the throttle of the automotive engine to engage such a one-way clutch when it is desired to engage the positive clutch. The one-way clutch, under these conditions, functions to synchronize the engaging parts of the positive clutch as will be readily understood.

It is another object of the invention to provide controlling means for the positive clutch and the engine throttle which is on the dashboard of the vehicle for allowing the operator at will to provide a two-way drive between the engine and the driving wheels of the vehicle.

It is a further object of the invention to provide improved mechanism for disengaging such a positive clutch when the transmission mechanism is shifted out of one speed ratio and for so engaging the one-way clutch to facilitate engagement of the positive clutch when the vehicle operator shifts to another speed ratio.

The invention consists of the novel constructions, arrangements and devices to be hereinafter described and claimed for carrying out the above-stated objects and such other objects as will appear from the following description of certain preferred embodiments illustrated in the accompanying drawings, wherein:

Fig. 1 is a diagrammatic illustration of a transmission and control mechanism therefor embodying the principles of the invention; and Fig. 2 is a diagrammatic illustration of another embodiment of the invention.

Referring now in particular to Fig. 1 of the drawings, there is illustrated a transmission having a drive shaft 10 and a driven shaft 11. The transmission is adapted to be installed in an automotive vehicle and is shown connected through a friction clutch 12, which may be of any suitable type, with an automotive engine 13. The transmission comprises a drive gear 14 connected to the shaft 10, driven gears 15 and 16 rotatably disposed on the driven shaft 11, a countershaft 17 having gears 18 and 19 fixed thereon and another gear 20 mounted on the countershaft by means of a one-way roller clutch 21. The gear 19 is in mesh with an idler gear 22 which is also in mesh with the gear 16 for providing a reverse drive power train as will be hereinafter described. The gears 18 and 20 are respectively in mesh with the gears 15 and 14, as shown. A positive type clutch 23 comprising a shiftable sleeve 24 is provided in parallel with the one-way clutch 21, and when the positive clutch is engaged it effectively locks up the one-way clutch 21 or provides a two-way drive in lieu of the one-way drive provided by the clutch 21, as will be appreciated from an inspection of the drawings.

Shift collars 25 and 26 are provided for completing the various power trains through the transmission. The collar 25 is engageable with clutch teeth 27 formed on the gear 14, and the collar 26 is engageable with teeth 28 and 29 formed on the gears 15 and 16, respectively. Blocker type synchronizers 30, 31 and 32 of any suitable well-known construction are provided for blocking a complete shift of the collars 25 and 26 until the parts to be engaged are in synchronism.

The sleeve 26, when shifted to the right into mesh with the teeth 29, conditions the transmission for a drive in reverse, and the reverse drive power train is from the drive shaft 10 through the gears 14 and 20 and the clutch 21 or the clutch 23 if the latter is engaged, the countershaft 17, the gears 19, 22 and 16 and the teeth 29 and collar 26 to the shaft 11. The collar 26, when shifted to the left to engage the teeth 28, conditions the transmission for forward drive and, assuming the collar 25 is not engaged with the teeth 27, the shaft 11 is driven in a low speed forward drive, the power train being from the shaft 10 through the gears 14 and 20 and the one-way clutch 21 or the positive clutch 23 if the latter is engaged, the countershaft 17, the gears 18 and 15 and the teeth 28 and collar 26 to the shaft 11. If the collar 25 is engaged with the teeth 27, the shaft 11 is driven at a high speed forward drive, and the power train is from the shaft 10 through the teeth 27 and the collar 25, the gear 15 and the teeth 28 and collar 26 to the driven shaft 11. In this drive, the positive clutch 23 is disengaged and the roller clutch 21 overruns.

Mechanism under the control of the accelerator 35 of the vehicle is utilized for shifting the transmission between its two forward speed ratios in which the shift collar 25 is respectively in and out of engagement with the teeth 27. The accelerator 35 is connected by any suitable means such as a link 36 with the throttle 37 for the vehicle engine 13. The link 36 has a lost motion connection 38 with the throttle for purposes to be hereinafter described. A switch 39 having contacts 40 and 41 is under the control of the accelerator 35 and is actuated when the accelerator is moved to its open throttle position. Prior to such actuation, the switch 39 is in its illustrated condition with its contacts 40 closed and its contacts 41 open. A governor 42 having contacts 43 which are closed above a predetermined speed of the vehicle has one of its contacts 43 connected in series with one of the contacts 40, and one of the contacts 43 is grounded as shown. The governor 42 may be of any suitable type and may be driven from the shaft 11 by means of a gear 44 fixed thereon. The contacts 40 of the switch 39 are connected with one of the contacts 45 of a switch 46, and this switch is connected with the winding 47 of a relay 48. The winding 47 is connected through a fuse 49 with the ignition switch 50 of the vehicle which in turn is connected with the vehicle battery 51. As will be apparent from an inspection of the circuit comprising the winding 47, the relay 48 is energized when the governor contacts 43 and the switch contacts 40 and 45 are closed.

The ignition circuit of the vehicle comprises the usual spark coil 52 and circuit breaker 53, which are connected with the ignition switch 50, and a condenser 54 connected across the breaker 53. The coil 52 is connected to contacts 55 in the relay 48, and the latter contacts are in turn connected with the contacts 41 of the switch 39. The contacts 41 are connected with a switch 56 which is disposed on the operating arm 57 of a vacuum motor 58 and has one of its contacts grounded, as shown.

The operating arm 57 of the motor 58 is connected to a lever 59 pivoted at 60, and the lever 59 operates the collar 25 as will be apparent from an inspection of the drawings. The vacuum motor 58 comprises a piston 61 which is adapted to have vacuum applied thereto from a valve 62 and which is connected with the arm 57. A spring 63 is provided in the motor 58 for yieldingly holding the piston 61 in its illustrated position, and the motor comprises also an electric holding coil 64 for holding the piston at the other end of its movement. The valve 62 is connected to a source of vacuum such as, for example, the manifold of the engine 13. The valve comprises a piston 65 which is actuated by an electric solenoid 66, and the arrangement of the valve is such that when the solenoid 66 is deenergized, the piston 61 is exposed to the atmosphere, while when the piston 65 is moved by energization of the solenoid 66, the piston 61 has vacuum applied thereto. The relay 48 has contacts 67, and these contacts are connected both to the electric current supply through the fuse 49 and also with the solenoid 66, and the latter is connected with the holding coil 64 which has one end grounded, as shown.

The contacts 55 of the relay 48 are closed and the contacts 67 of the relay are open when the relay is deenergized, in the condition in which the relay is illustrated. Assuming the collar 26 has been shifted to engage the teeth 28 of the gear 15, the shaft 11 will be driven at low speed forward drive. The piston is in its illustrated position for this drive, and the solenoid 66 of the valve 62 is deenergized so that the valve 62 is in the condition in which it is illustrated. The winding 47 of the relay 48, being connected with the governor contacts 43, remains deenergized until the speed of the shaft 11 reaches a predetermined value and the contacts 43 close. The winding 47 of the relay 48 is energized when the contacts 43 close, the winding circuit being completed through the contacts 40 of the switch 39. The contacts 55 of the relay are thus opened and the contacts 67 are closed when the vehicle reaches a predetermined speed. The closure of the contacts 67 applies electric voltage to the solenoid 66 and holding coil 64, and the valve piston 65 is thus moved into its position in which vacuum is applied to the piston 61, shifting the piston to the right as illustrated in the drawing against the action of the spring 63. The collar 25 is thus shifted to the left and will engage with the teeth 27 as soon as the shafts 10 and 11 are synchronized, such engagement being prevented prior to synchronization of the shafts by the blocker 30. The operator releases the accelerator 35 to reduce the speed of the shaft 10, and the blocker 30 allows the sleeve 25 to move into its engaged position after synchronization of the shafts 10 and 11, and the transmission is then in direct drive.

The transmission may be downshifted from high speed forward drive to low speed forward drive by depressing the accelerator to fully open throttle position to break the circuit through the contacts 40 and complete the circuit through the contacts 41 of the switch 39. Breakage of the circuit through the contacts 40 has the effect of deenergizing the relay 48 to close the relay contacts 55 and open the relay contacts 67. Opening of the relay contacts 67 causes deenergization of the solenoid 66 so that the valve 62 again admits atmospheric pressure to the motor 58, and the spring 63 is then effective to move the collar 25 back to its illustrated position. The pressure between the teeth 27 and the collar 25 due to torque transmitted therethrough and tending to hold the collar in its engaged position is relieved due to an ignition interruption caused by a completion of a circuit through the contacts 41 of the switch 39. The spark coil 52 is grounded through the relay contacts 55, the switch contacts 41 and the switch 56 which is closed when the collar 25 is in its engaged position to interrupt the ignition. The torque between the teeth 27 and collar 25 being thus relieved, the collar 25 shifts back into its illustrated position due to the action of the spring 63. This movement of the piston 61 opens the switch 56, and the engine ignition is thus restored.

Manually controlled mechanism is provided for supplying a two-way drive in low speed ratio through the transmission. This mechanism comprises a manual control 70 on the dashboard 71 of the vehicle and which is connected by means of a suitable linkage 72 with a lever 73 pivoted at 74. The lever 73 engages the shift collar 24 of the positive clutch 23, and the arrangement is such that when the manual control 70 is moved to the right as seen in the drawing, the lever 73 is rotated about its center 74 so as to engage the positive clutch 23. The manual control 70 is provided with a notch 75 and this cooperates with the switch 46 so as to open the switch when the control is moved to engage the clutch 23. The switch 46 is shown in two places in Fig. 1; however, it will be understood that this is simply a single switch and is simply illustrated in this manner for convenience of illustration. The switch 46 when opened by such movement of the manual control 70 functions to break the circuit through the relay winding 47 and to thereby deenergize the relay and valve solenoid 66 for causing a movement of the piston 61 to its illustrated position and a corresponding disengaging movement of the collar 25 for downshifting the transmission, assuming that the transmission was formerly in high speed ratio. It is assumed that the accelerator 35 has been so manipulated by releasing it to close the throttle so that the torque between the teeth 27 and collar 25 does not function to prevent disengagement of the collar 25. If the transmission is in low speed ratio when the control 70 is actuated, such opening of the switch 46 assures that there will be no subsequent upshift of the transmission.

The lever 73 is connected by linkage 76 with an electric switch 77. The switch 77 comprises a switch arm 78 connected to the linkage 76 and three portions 79, 80 and 81 over which the arm 78 moves. The portions 79 and 81 are non-conducting while the portion 80 is electrically conducting and completes a circuit with the arm 78 when the arm passes over the latter portion. The portion 80 is connected to the battery 51 and the arm 78 is connected to a solenoid throttle operator or motor 82, as shown.

The solenoid throttle operator comprises two windings 83 and 84 having an armature or plunger 85 disposed therein which is connected by means of a link 86 with the throttle 37. Each of the windings 83 and 84 is electrically connected to the switch arm 78, and the connection between the arm 78 and winding 84 is through a switch 87 which is opened when the armature 85 moves to the left as seen in the drawing. When a circuit is completed from the battery 51 through the portion 80 and arm 78 to both of the windings 83 and 84, the plunger 85 is moved to the left as seen in the drawing to open the engine throttle, and this movement of the throttle 37 is without a corresponding movement of the accelerator pedal 35 due to the lost motion connection 38. The plunger 85 functions to open the switch 87 when it completes its movement, and the winding 84 is thus deenergized; however, the winding 83 keeps the plunger 85 in its throttle opening position as long as this winding is kept in energized condition.

Assuming that the transmission is in its low speed ratio, a movement of the manual control 70 causes an engagement of the positive clutch 23 to lock up the one-way clutch 21 and provide a two-way drive between the gear 20 and gear 18 in the low speed power train, and such movement of the manual control 70 prior to an engagement of the positive clutch 23 causes a temporary opening of the engine throttle due to the energization of the solenoid mechanism 82 by a movement of the arm 78 over the conducting contact 80 of the switch 77. This temporary opening of the engine throttle has the effect of engaging the one-way clutch 21 and thereby synchronizing the parts of the positive clutch 23 prior to engagement thereof. It is contemplated that there shall be sufficient lost motion between the parts of the positive clutch 23 which will allow an engagement of the clutch even though the engaging parts are not exactly in line when the one-way clutch 21 is engaged. The notch 75 in the manual control 70 assures that the circuit including the relay winding 47 is open when the positive clutch 23 is engaged, and such opening of this circuit, assuming the transmission is in high speed ratio, will cause a downshift of the transmission. It will thus be apparent that a movement to the right of the manual control 70 on the dashboard 71 functions to shift the transmission into a two-way low speed drive.

The embodiment of the invention shown in Fig. 2 is illustrated with reference to a manually shifted transmission which comprises a drive shaft 100 and a driven shaft 101. The drive shaft 100 is driven from an engine 102 connected with the shaft by means of a friction clutch 103 of any suitable variety. The transmission comprises a gear 104 fixed on the drive shaft 100 and gears 105, 106 and 107 splined on the driven shaft 101. The gears 106 and 107 are fixed together in a cluster as shown. The transmission comprises also a rotatable countershaft having gears 108, 109 and 110 formed thereon, and a gear 111 in mesh with the gear 104 is connected to the countershaft by means of a one-way roller clutch 112. A positive clutch 113 comprising a shiftable collar 114 is disposed in parallel with the one-way clutch 112, as shown.

The gear 105 is formed with teeth adapted to mesh with the teeth on the gear 104 so as to provide a clutch 115 between the shafts 100 and 101. The transmission comprises also gears 116 and 117 slidably disposed on an idler shaft 118 and fixed together to form a cluster.

The transmission provides a four speed forward drive between the shafts 100 and 101 and also a reverse drive between the shafts. For first speed the gear 107 is meshed with the gear 110; for second speed the gear 106 is meshed with the gear 109; for third speed the gear 105 is meshed with the gear 108; and for fourth speed the positive clutch 115 is engaged. For reverse drive the gears 116 and 117 are moved to the left as seen in the figure to mesh the gear 116 with the gear 119 and the gear 117 with the gear 107.

The gear 105 may be shifted by means of a shift fork 119 on a shift rail 120, and the gears 106 and 107 may be shifted by means of a shift fork 121 on a shift rail 122. Suitable interlocking mechanism 123, of any suitable well known construction may be used between the rails 120 and 122 for preventing a shifting of both of the rails out of their neutral positions at the same time. The shift rails may be shifted by means of a lever 124 which is rotatable and which is also laterally movable in order that it may enter either of the notches 125 in either of the rails 120 and 122 for engaging one rail or the other.

The lever 124 is rotated for reciprocating either of the rails 120 or 122 and is also moved laterally in order to move it either into one of the notches 125 by means of a shift lever 126 located immediately beneath the vehicle steering wheel 127. The lever 126 is fixed to a shaft 128 which has a rotatable connection 129 with a shaft 130. The lever 124 is fixed to the shaft 130, and the arrangement is such that a longitudinal movement of the shaft 128 by means of the lever 126 causes a corresponding longitudinal movement of the shaft 130 and a lateral movemnt of the shift lever 124 to move the latter lever into either of the notches 125.

The shaft 128 has a lever 131 fixed thereto which when oscillated by the hand lever 126 abuts against lugs 132 on a lever 133 which is fixed on a sleeve-shaft 134 surrounding the shaft 128. The shaft 134 has a lug 135 extending into an opening 136 formed in the shaft 130 so that oscillation of the shaft 134 causes a similar oscillation of the shaft 130 for shifting either of the rails 120 or 122. It will thus be apparent that oscillation of the shaft 128 and hand lever 126 of itself causes no oscillation of the shaft 130 due to the rotatable connection 129 between the shafts but longitudinal movement of the shaft 128 does cause corresponding longitudinal movement of the shaft 130 to cause the shift lever 124 to enter either of the slots 125. The lug 135 moves within the opening 136 to allow longitudinal movement of the shafts 128 and 130 without corresponding longitudinal movement of the sleeve shaft 134. The arrangement of the lever 131 and the lever 133 provides a lost motion connection between the shafts 128 and 134, and after the hand lever 126 is oscillated a predetermined distance, the lever 131 abuts either of the lugs 132 and causes a corresponding movement of the lever 133 and of the sleeve 134 to oscillate the shaft 130 and the shift lever 124 to shift either of the rails 120 or 122. The two levers 131 and 133 are yieldably held in their illustrated relative positions in which the lever 131 is out of contact with the lugs 132 by springs 137.

The two levers 131 and 133 actuate a switch 138, and the arrangement is such that the switch is closed when the lever 131 is in contact with either of the lugs 132 on the lever 133. This switch 138 is utilized to control the throttle of the engine 102, the ignition system of the engine and also the shift collar 114 of the positive clutch 113 as will be hereinafter described. The switch 138 is connected with one end of a winding 139 of a relay 140. The relay 140 comprises an armature having two portions 141 and 142 which are insulated from each other, and the other end of the winding 139 is connected with the armature portion 141 which in turn is connected with a fuse 143. The fuse 143 is connected with the battery 144 of the vehicle which constitutes the source of electric supply.

The spark coil 145 constituting a portion of the ignition system of the engine 102 is connected with the other armature portion 142 as shown. The armature portion 142 carries a switch contact 146 adapted to complete an electric circuit with another contact 146 which is stationary, and the latter contact is connected with the ignition switch 147 of the vehicle. The battery is connected with the coil 145 by means of the ignition switch 147 and the contacts 146, as shown.

The armature portion 141 which is connected to the battery 144 through the fuse 143 carries a contact 148 which is adapted to complete an electric circuit with another contact 148 that is stationary. The latter contact is connected with the solenoid 149 of a vacuum valve 150. The valve 150 comprises a movable plunger 151 which controls the admission of vacuum to a vacuum motor 152. The vacuum unit 152 comprises a movable piston 153, an electric holding coil 154, and a spring 155 acting on the piston. The holding coil 154 is connected in series with the solenoid 149 and is grounded as shown. The arrangement of the vacuum valve 150 and vacuum unit 152 is such that the plunger 151 is moved when the solenoid 149 is energized so as to apply vacuum to the piston 153 to move the piston against the spring 155, and after the plunger has completed its movement, the coil 154 functions as an additional means for holding the piston in its changed position. The piston 153 is connected by means of a linkage 166 with the collar 114 so that movement of the piston causes a corresponding movement of the collar. The collar 114 and piston 153 in their illustrated positions correspond to engaged condition of the clutch 113, and when the piston is moved to the right as seen in the figure, the collar 114 is moved to disengage the clutch 113.

The throttle 167 of the engine 102 is actuated by the usual accelerator pedal 168 connected therewith by any suitable linkage 169. The throttle 167 is also adapted to be actuated by a motor in the form of a throttle solenoid 170 having a plunger 171 connected by linkage 172 with the throttle 167. The solenoid 170 at one end is connected with a stationary contact 173 which makes contact with another contact 173 disposed on the armature portion 141. The solenoid 170 at its other end is connected with a contact 174 which is part of a switch 175 actuated by the piston 153. The other contact 174 of this switch is grounded as shown. The switch 175 is closed when the piston 153 is in a position corresponding to disengaged position of the clutch collar 114, and the solenoid 170 may be then energized to open the throttle 167 for purposes hereinafter to be described.

Another switch 176 comprising contacts 177 is actuated by the piston 153 of the vacuum unit 152, and this switch like the switch 175 is closed when the piston 153 is in its position corresponding to disengaged condition of the positive clutch 113. One of the contacts 177 is connected with the ignition switch 147, and the other of the contacts 177 is connected with the spark coil 145 of the ignition system for the engine 102, and, as will be described, this switch provides an alternate source of current from the battery 144 to the coil 145 instead of that provided through the contacts 146.

In the operation of the transmission control mechanism, the hand lever 126 causes a number of different operations to occur. The hand lever on a shifting thereof functions by means of the switch 138 to temporarily disable the ignition system for the engine 102 and to disengage the positive clutch 113 when the ignition is disabled; it functions through the shafts 134 and 130 to shift one of the rails 120 and 122 to complete another gear train; and it thereafter temporarily opens the throttle for the engine 102 to engage the one-way clutch 112 and causes an engagement of the positive clutch 114 while the engaging parts of the positive clutch are synchronized by engagement of the one-way clutch. The combination of the positive clutch 113 and the one-way clutch 112 is provided so that the countershaft including the gears 108, 109 and 110 may be disconnected from the drive shaft 100 when a shift is to be made into another gear ratio and the weight and moment of inertia of the parts that must be slowed down in order to engage one of the gears 105, 106 or 107 is decreased. Disengagement of the positive clutch 113 disconnects the gears 104 and 111 together with the shaft 100, and any parts of the clutch 103 connected with the shaft 100, from the countershaft including the gears 108, 109 and 110. This double clutch construction is particularly advantageous for heavy transmissions, such as those for trucks, in which the parts are especially heavy.

Movement of the hand shift lever 126 to move the shaft 128 longitudinally has the effect of locating the shift lever 124 in either of the notches 125 of either the rail 120 or the rail 122. Rotational movement of the lever 126, thereafter, has the effect of closing the switch 138, and this switch is closed prior to any movement of either of the rails 120 and 122 by means of the shafts 130 and 134. The switch then completes a circuit from the battery 144, through the fuse 143, the armature portion 141 and the winding 139 to energize the relay 140 and draw the armature downwardly to bring the contacts 146 and 173 out of contact and to bring the contacts 148 into contact. Separation of the contacts 146 disconnects the spark coil 145 from the battery 144, so that the ignition system is not connected in any way with the battery, and the ignition system is thus disabled causing the engine to exert a drag on the shaft 100. The contacts 148 which are brought together complete a circuit from the battery and fuse to the solenoid 149 of the valve 150 and through the holding coil 154 of the vacuum unit. The plunger 151 of the valve 150 is thus moved, and vacuum is applied to the piston 153 of the vacuum unit 152. The direction of the torque transmitted through the positive clutch 113 which has heretofore been in engaged condition is reversed due to the simultaneous disabling of the ignition system to allow disengagement of the clutch, and the vacuum exerted on the piston 153 has the effect of moving the piston and the collar 114 of the positive clutch 113 to disengage the positive clutch. The one-way clutch 112 may then release to allow the gears 108, 109 and 110 to rotate faster than the gear 111 and the parts connected therewith and engagement of any of the gears 105, 106 or 107 with the gears 108, 109 and 110 may be made without bringing the gear 111 and the parts connected therewith to any particular speed. Further movement of the hand lever 126 has the effect of engaging one of the gears 105, 106 and 107 with one of the gears 108, 109 or 110 by means of the lugs 132 acted on by the lever 131 and the lever 133 and shaft 134 to complete another power train through the transmission.

Movement of the piston 153 to its clutch disengaging position has the effect of closing the switch 176, and the battery 144 is again connected with the spark coil 145 through the switch 176. The switch 176 is in parallel with the switch contacts 146, and closing of the switch 176 reenergizes the ignition system when the clutch 113 opens regardless of the fact that the relay 140 may remain energized. This movement of the piston 153 also has the function of closing the switch 175 for purposes hereinafter to be described.

Upon the operator releasing the hand lever 126 after a shift has been made allowing the springs 137 to open the switch 138, the relay 140 is de-energized, and the armature moves back into its illustrated position. The ordinary connection between the battery and the spark coil 145 is then again completed through the contacts 146. The contacts 173 are brought together by this movement of the armature, and these contacts complete a circuit from the battery and fuse through the throttle solenoid 170 and through the switch 175. The throttle solenoid 170 is thus energized, and its armature 171 is moved to open the throttle 167 and increase the speed of the engine 102. This increase in the engine speed functions to engage the one-way clutch 112 and the parts of the positive clutch 113 are thus synchronized so that the positive clutch may be easily engaged. Movement of the armature back to its illustrated position also has the effect of opening the contacts 148, and the holding coil 154 and the vacuum valve 150 are de-energized. Upon this synchronization of the engaging parts of the positive clutch 113 and de-energization of the valve 150, the spring 155 moves the clutch collar 114 back to engaged position to reengage the positive clutch 113. On this movement of the positive clutch collar 114 and piston 153, the switches 176 and 175 are opened, and opening of the latter switch has the effect of breaking the circuit through the throttle solenoid 170 to allow the throttle to be returned again to closed condition by the spring means (not shown) provided in the throttle according to standard practice. The transmission is then in another speed ratio with one of the gears 105, 106 or 107 being engaged with one of the gears 108, 109 or 110, and since the positive clutch 113 is engaged, this is a two-way drive. The accelerator 168 may thereafter be utilized for controlling the throttle 167 to increase the speed of the engine as may be desired.

Due to the fact that the positive clutch 113 has the effect of effectively disconnecting the gears 108, 109 and 110 from the engine and from the gears 104 and 111 and the parts connected therewith, the friction clutch 103 need not be disengaged in making a shift into first, second or third gears. The clutch 113, however, as is apparent, is not effective to break the power train between the engine and the gear 104, and it is thus contemplated that the friction clutch 103 shall be disengaged for shifting into direct drive by engagement of the positive clutch 115.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, an engine for driving said shaft and having an ignition system and a throttle, a driven shaft, means for providing a plurality of power trains of different speed ratio between said shafts and including a one-way coupling and a positive coupling in parallel with the one-way coupling for completing at least one of said power trains, and control means for said positive coupling and including means for disabling said ignition system to allow disengagement of the positive coupling, said control means including means for temporarily opening said throttle and increasing the speed of said engine whereby to engage said one-way coupling prior to engagement of said positive coupling.

2. In transmission mechanism, the combination of a drive shaft, an engine for driving said shaft and having an ignition system and a throttle, a driven shaft, means for providing a plurality of power trains of different speed ratio between said shafts and including a one-way coupling and a positive coupling in parallel with the one-way coupling for completing the power trains, and control means for shifting from one of said ratios to another and including means for disengaging said positive coupling and disabling said ignition system to allow the positive coupling to be disengaged on a shift out of one of the ratios and including means for temporarily opening said throttle and increasing the speed of said engine to engage said one-way coupling and engaging the positive coupling when the one-way coupling is engaged on a shift into another speed ratio.

3. In transmission mechanism, the combination of a drive shaft, an engine for driving said shaft and having an ignition system and a throttle, a driven shaft, means for providing a plurality of power trains of different speed ratio between said shafts and including a one-way clutch and a positive clutch in parallel with the one-way clutch for completing the power trains, and control means including a manual control for shifting the transmission mechanism between its various speed ratios, said control means including means for disabling said ignition system and disengaging said positive clutch on a shift out of one of the speed ratios and means for temporarily opening said throttle and increasing the speed of said engine whereby to engage said one-way clutch and then engaging said positive clutch on the transmission mechanism being shifted into another speed ratio.

4. In transmission mechanism, the combination of a drive shaft, an engine for driving said shaft and having an ignition system and a throttle, a driven shaft, means for providing a plurality of power trains of different speed ratio between said shafts and including a one-way clutch and a positive clutch in parallel with the one-way clutch for completing the power trains, and control means including a manual control for shifting from one speed ratio to another, said control means including a motor for disengaging said positive clutch and a motor for opening said throttle, and a switch actuated by said manual control when the control is used to shift from one speed ratio to another, said switch and motors being so interconnected that the ignition system is disabled and said positive clutch is disengaged when the manual control is utilized to shift out of one speed ratio and said throttle is temporarily opened to increase the speed of the engine to thereby engage said one-way clutch and said positive clutch is thereafter engaged when said manual control is utilized for shifting into another speed ratio.

5. In transmission mechanism, the combination of a drive shaft, an engine for driving said shaft, a driven shaft, means providing a power train for connecting said shafts and including an engaging means for rendering said power train operative when engaged, means providing a second power train and including a one-way engaging means and a positive engaging means in parallel to complete said second power train, actuating means for both said first-named engaging means and said positive engaging means, control means for temporarily increasing the speed of said engine whereby to engage said one-way engaging means prior to engagement of said positive engaging means to facilitate engagement of the latter, and a control for said actuating and control means for disengaging said first named engaging means for rendering said first named power train inoperative and temporarily increasing the speed of said engine and engaging said positive engaging means for rendering said second power train operative all on an operative stroke of the control.

6. In transmission mechanism, the combination of a drive shaft, an engine for driving said shaft, a driven shaft, means providing a power train for connecting said shafts and including a clutch for rendering said power train operative when engaged, means providing a second power train and including a one-way clutch and a positive clutch in parallel, actuating means for both said first-named clutch and said positive clutch, control means for temporarily increasing the speed of said engine whereby to engage said one-way clutch prior to engagement of said positive clutch to facilitate engagement of the latter, and a control for said actuating and control means for disengaging said first named clutch for rendering said first named power train inoperative and temporarily increasing the speed of said engine and engaging said positive clutch for rendering said second power train operative all on an operative stroke of the control.

7. In transmission mechanism, the combination of a drive shaft, an engine for driving said shaft and having a throttle for controlling the speed of the engine, a driven shaft, means providing a power train for connecting said shafts and including a clutch for rendering said power train operative when engaged, means providing a second power train and including a one-way clutch and a positive clutch in parallel, actuating means for both said first-named clutch and said positive clutch, control means connected with said engine throttle for temporarily increasing the speed of said engine whereby to engage said one-way clutch prior to engagement of said positive clutch to facilitate engagement of the latter, and a manual control for said actuating and control means for disengaging said first named clutch for rendering said first named power train inoperative and temporarily increasing the speed of said engine and engaging said positive clutch for rendering said second power train operative all on an operative stroke of the control.

8. In transmission mechanism, the combination of a drive shaft, an engine for driving said shaft and having a throttle for controlling the speed of the engine, a driven shaft, means providing a power train for connecting said shafts and including a clutch for rendering said power train operative when engaged, means for providing a second power train and including a one-way clutch and a positive clutch in parallel, actuating means for both said first-named clutch and said positive clutch, control means connected with said engine throttle for temporarily increasing the speed of said engine whereby to engage said one-way clutch prior to engagement of said positive clutch to facilitate engagement of the latter, and a manual control for said actuating and control means for disengaging said first named clutch for rendering said first named power train inoperative and temporarily increasing the speed of said engine and engaging said positive clutch for rendering said second power train operative all on an operative stroke of the control, said control means including an electric solenoid operative on the throttle of said engine and a switch electrically connected with said solenoid and operated by said manual control.

9. In transmission mechanism for an automotive vehicle having a dashboard, the combination of a drive shaft, an engine for driving said shaft and having a throttle for controlling the speed of the engine, a driven shaft, means providing a power train for connecting said shafts and including a clutch for rendering said power train operative when engaged, means for providing a second power train and including a one-way clutch and a positive clutch in parallel, a motor for actuating said first-named clutch, actuating means for said positive clutch, control means for temporarily increasing the speed of said engine and including an electric solenoid operative on said engine throttle whereby to engage said one-way clutch prior to engagement of the latter, and a manual control on the dashboard of the vehicle for said actuating and control means and motor for disengaging said first named clutch for rendering said first named power train inoperative and temporarily increasing the speed of said engine and engaging said positive clutch for rendering said second power train operative all on an operative stroke of the control.

10. In transmission mechanism, the combination of a drive shaft, an engine for driving said shaft, a driven shaft, means for providing first and second power trains of different speed ratio between said shafts, a clutch for completing said first power train when engaged, a one-way clutch and a positive clutch in parallel to complete said second power train, actuating means for both said first-named clutch and said positive clutch, control means for temporarily increasing the speed of said engine whereby to engage said one-way clutch prior to engagement of said positive clutch to facilitate engagement of the latter, and a control for said actuating means and control means for disengaging said first-named clutch to break said first power train and temporarily increasing the speed of the engine and for engaging said positive clutch to complete said second power train all on an operative stroke of the control.

11. In transmission mechanism, the combination of a drive shaft, an engine for driving said shaft and having a throttle, a driven shaft, means providing a relatively high speed ratio power train between said shafts and including a positive clutch for completing the power train when engaged, means providing a relatively low speed ratio power train between said shafts and including a one-way clutch and a positive clutch in parallel to complete the power train, actuating means for both of said positive clutches, control means operative on the vehicle throttle for temporarily increasing the speed of said engine whereby to engage said one-way clutch prior to engagement of said second-named positive clutch to facilitate engagement of the latter, and a control for said actuating means and control means for disengaging said first-named clutch to break said high speed ratio power train and temporarily increasing the speed of the engine and for engaging said second-named positive clutch to complete said low speed ratio power train all on an operative stroke of the control.

PALMER ORR.

REFERENCES CITED

The following references are of record in the file of this patent:

UNITED STATES PATENTS

| Number | Name | Date |
| --- | --- | --- |
| 1,478,529 | Richardson | Dec. 25, 1923 |
| 2,101,275 | Starkey | Dec. 7, 1937 |
| 2,216,138 | Sellers | Oct. 1, 1940 |